(12) United States Patent
Sun et al.

(10) Patent No.: US 11,762,859 B2
(45) Date of Patent: Sep. 19, 2023

(54) DATABASE QUERY WITH INDEX LEAP USAGE

(71) Applicant: International Business Machines Corporation, Armonk, NY (US)

(72) Inventors: Sheng Yan Sun, Beijing (CN); Shuo Li, Beijing (CN); Xiaobo Wang, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 17/034,276

(22) Filed: Sep. 28, 2020

(65) Prior Publication Data

US 2022/0100765 A1    Mar. 31, 2022

(51) Int. Cl.
*G06F 16/245* (2019.01)
*G06F 16/22* (2019.01)
*G06F 16/2455* (2019.01)
*G06F 16/2453* (2019.01)

(52) U.S. Cl.
CPC .... *G06F 16/24564* (2019.01); *G06F 16/2228* (2019.01); *G06F 16/24544* (2019.01)

(58) Field of Classification Search
USPC .......................................................... 707/769
See application file for complete search history.

(56) References Cited

U.S. PATENT DOCUMENTS

| | | | |
|---|---|---|---|
| 5,404,510 A | 4/1995 | Smith | |
| 7,031,956 B1 * | 4/2006 | Lee | G06F 16/986 707/E17.118 |
| 2014/0032525 A1 * | 1/2014 | Merriman | G06F 16/27 707/713 |
| 2014/0258209 A1 * | 9/2014 | Eshleman | G06F 16/254 707/602 |
| 2016/0132572 A1 * | 5/2016 | Chang | G06F 16/243 707/723 |
| 2017/0046421 A1 * | 2/2017 | Cao | G06F 16/211 |

(Continued)

FOREIGN PATENT DOCUMENTS

| | | |
|---|---|---|
| CN | 104794123 A | 7/2015 |
| CN | 107807932 A | 3/2018 |

(Continued)

OTHER PUBLICATIONS

Ramez Elmasri; Fundamentals of Database System; Pearson; Fourth; pp. 823, 824 (Year: 2003).*

(Continued)

*Primary Examiner* — Albert M Phillips, III
*Assistant Examiner* — Jermaine A Mincey
(74) *Attorney, Agent, or Firm* — Gilbert Harmon, Jr.

(57) ABSTRACT

Embodiments of the present disclosure relate to an approach for database query. According to the approach, a query for a group of data records is received. At least one index is created on at least one field of the data records and comprises index entries for storing and sorting respective values of the at least one field of the data records. It is determined if the query satisfies a predetermined condition. In response to the query satisfying the predetermined condition, a result of the query is determined by skipping at least a part of operations required by the query based on the at least one index.

20 Claims, 5 Drawing Sheets

(56) References Cited

U.S. PATENT DOCUMENTS

2017/0103103 A1* 4/2017 Nixon ................ G06F 16/2452
2017/0139594 A1  5/2017 Ahn
2017/0193041 A1  7/2017 Fuchs

FOREIGN PATENT DOCUMENTS

CN    108776678 A    11/2018
CN    110134661 A     8/2019

OTHER PUBLICATIONS

Douglas Kunda; A Comparative Study of NoSQL and Relational Database; Zambia Information Communication Technology (ICT) Journal;2017; pp. 1-4 (Year: 2017).*

"$lookup (aggregation)", MongoDB Manual, downloaded from the internet on Sep. 22, 2020, 11 pages, <https://docs.mongodb.com/master/reference/operator/aggregation/lookup/#pipe._S_lookup>.

Mell et al., "The NIST Definition of Cloud Computing", Recommendations of the National Institute of Standards and Technology, NIST Special Publication 800-145, Sep. 2011, 7 pages.

* cited by examiner

DATABASE QUERY WITH INDEX LEAP USAGE

BACKGROUND

The present disclosure relates to machine learning, and more specifically, to improving database queries based on index leap usage.

Performance is important for not only a relational database but also a non-relational database. In a non-relational database (also referred to as "NoSQL database"), indexes can be created on a data table comprising a group of data records to support efficient execution of a query. However, there are still some limitations as to the index usage in the non-relational database, resulting in low query efficiency.

SUMMARY

According to one embodiment of the present disclosure, there is provided a computer-implemented method for processing a database query. The method comprises receiving a query for a group of data records, wherein at least one index is created on at least one field of the data records and comprises index entries for storing and sorting respective values of the at least one field of the data records. The method further comprises determining if the query satisfies a predetermined condition and in response to the query satisfying the predetermined condition, determining a result of the query by skipping at least a part of operations required by the query based on the at least one index.

According to another embodiment of the present disclosure, there is provided a system for processing a database query. The system comprises a processing unit and a memory coupled to the processing unit. The memory stores instructions that, when executed by the processing unit, perform actions comprising: receiving a query for a group of data records, wherein at least one index is created on at least one field of the data records and comprises index entries for storing and sorting respective values of the at least one field of the data records; determining if the query satisfies a predetermined condition; and in response to the query satisfying the predetermined condition, determining a result of the query by skipping at least a part of operations required by the query based on the at least one index.

According to yet another embodiment of the present disclosure, there is provided a computer program product. The computer program product is tangibly stored on non-transient machine-readable medium and comprises machine-executable instructions. The machine-executable instructions, when executed on a device, cause the device to perform acts comprising: receiving a query for a group of data records, wherein at least one index is created on at least one field of the data records and comprises index entries for storing and sorting respective values of the at least one field of the data records; determining if the query satisfies a predetermined condition; and in response to the query satisfying the predetermined condition, determining a result of the query by skipping at least a part of operations required by the query based on the at least one index.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Figure 1:
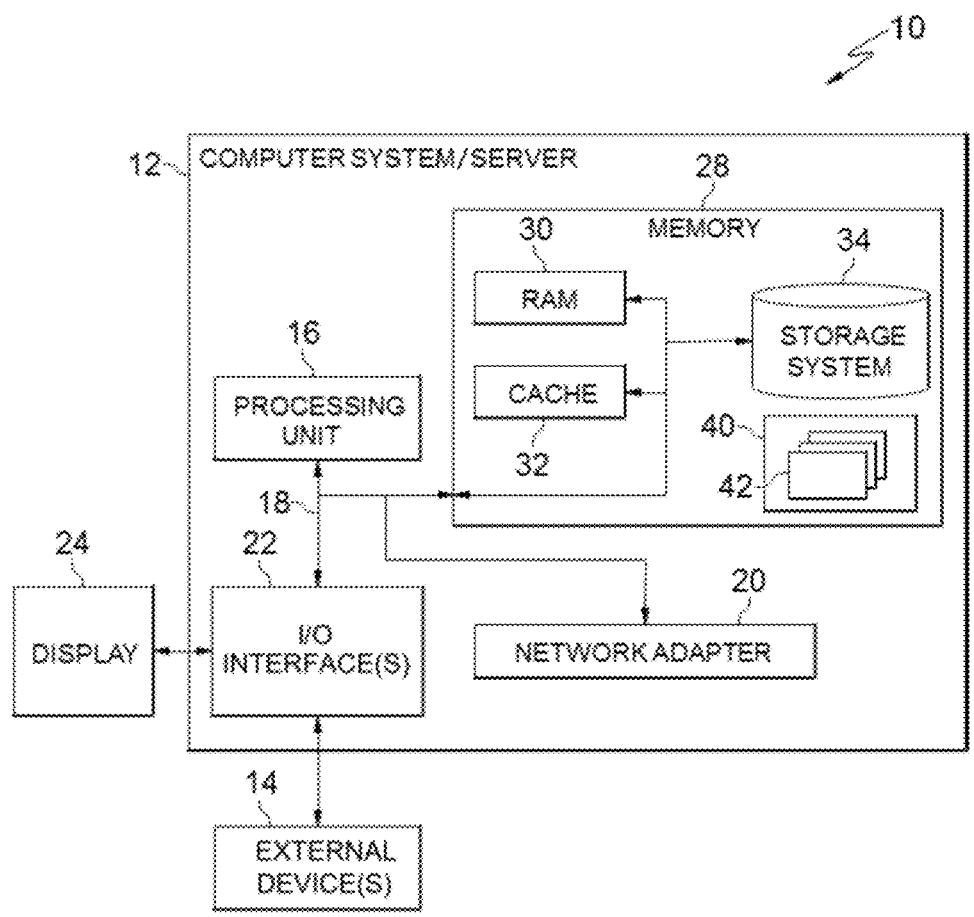
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
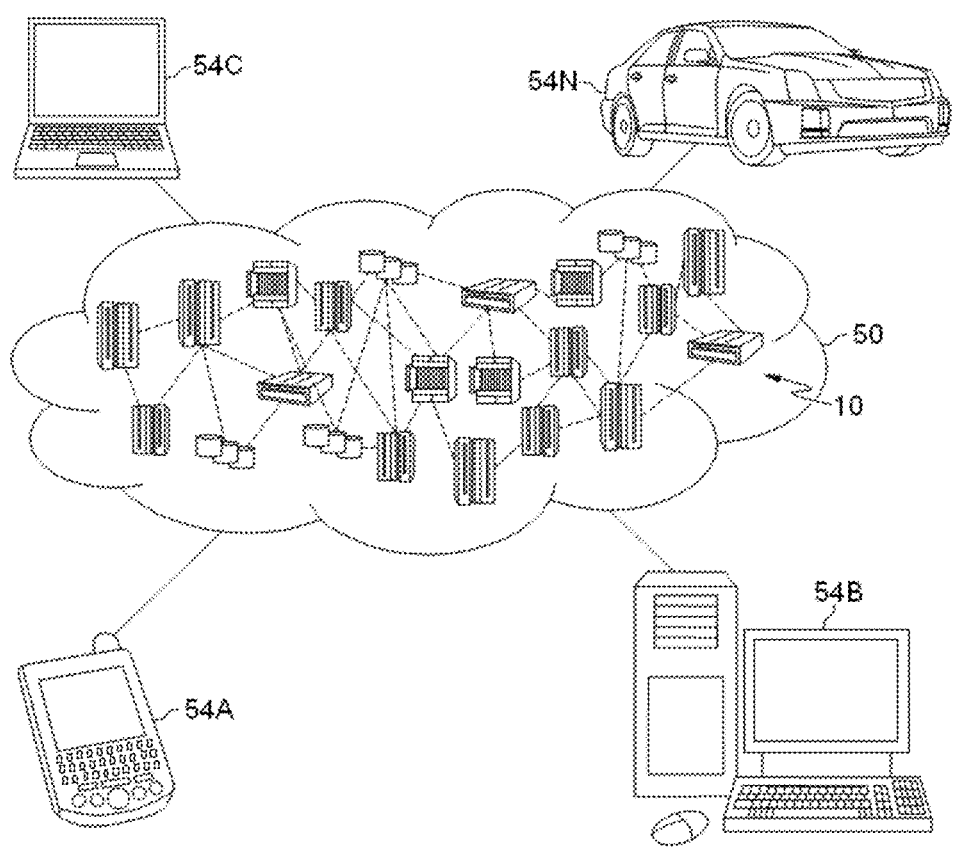
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
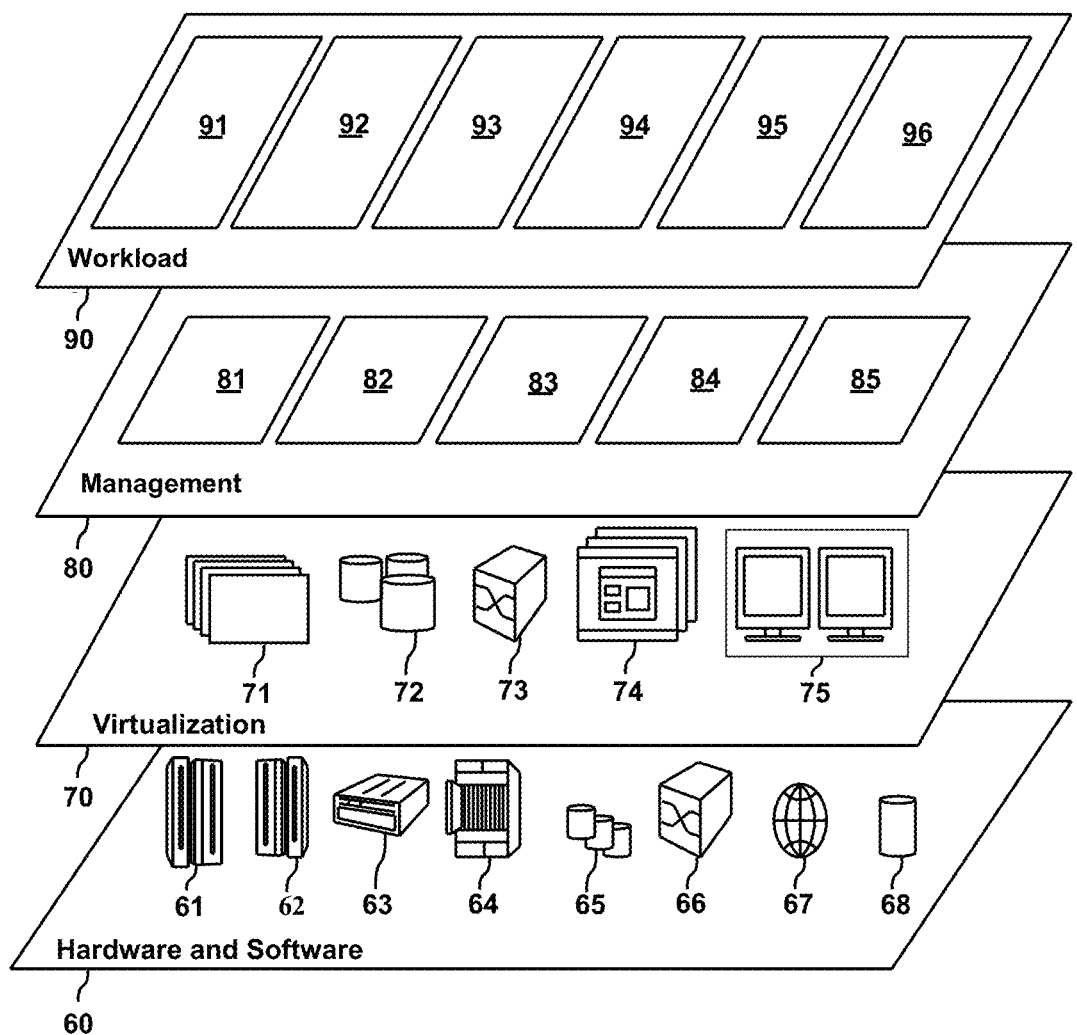
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database query 96. Hereinafter, reference will be made to FIG. 4 to FIG. 5 to describe details of the database query 96.

In a non-relational database (also referred to as "NoSQL database"), indexes can be created on a data table comprising a group of data records. For example, in MongoDB, indexes can be created on a collection comprising a group of documents. An index is a special data structure comprising a plurality of index entries, each storing value(s) of one or more fields of a corresponding document. The index entries are ordered by the value(s) of the one or more fields. The ordering of the index entries supports efficient execution of a query by scanning index entries instead of scanning all the documents.

However, there are still some limitations as to the index usage in the non-relational database, resulting in low query efficiency. For example, in some scenarios, in a non-relational database, a result of the query can be determined by scanning the ordered index entries instead of scanning all the documents. However, not every scan of an index entry contributes to the result of the query. Moreover, for performance considerations, a non-relational database usually has some limitations to multi-table join operations. Although there may be indexes created for multiple tables, scanning each index entry thereof to determine whether a join condition and/or a query condition is satisfied or not is still of poor performance.

In order to at least partially solve the above and other potential problems, embodiments of the present disclosure provide an approach for processing a database query. According to embodiments of the present disclosure, a query for a group of data records is received. At least one index is created on at least one field of the data records and comprises index entries for storing and sorting respective values of the at least one field of the data records. In response to the query satisfying a predetermined condition, a result of the query is determined by skipping at least a part of operations required by the query based on the at least one index. In this way, the performance for executing a query in a database can be greatly improved.

In the following description, a NoSQL database (for example, MongoDB), will be taken as an example database for describing embodiments of the present disclosure in detail. It is to be understood that this is merely for the purpose of illustration, without suggesting any limitations as to the scope of the present disclosure. Embodiments of the present disclosure can also be applied to a relational database.

In MongoDB, a data table is referred to as a collection and data records or data rows are referred to as documents. Each document includes a set of key-value pairs and a key is also referred to as a field. In the following description, the terms "data table" and "collection" can be used interchangeably, the terms "data record", "row" and "document" can be used interchangeably, and the terms "column", "field" and "key" can be used interchangeably.

Figure 4:
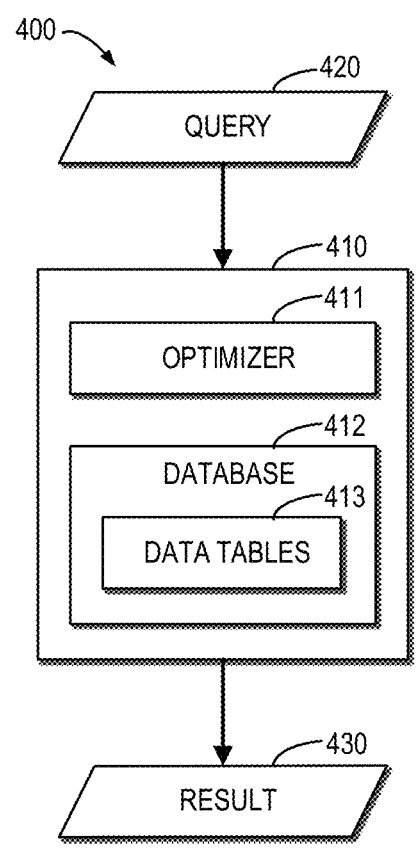
FIG. 4 depicts a system according to embodiments of the present disclosure.

With reference now to FIG. 4, a system 400 in which embodiments of the present disclosure can be implemented is shown. It is to be understood that the structure and functionality of the system 400 are described only for the purpose of illustration without suggesting any limitations as to the scope of the present disclosure. The embodiments of the present disclosure can be embodied with a different structure and/or functionality.

As shown in FIG. 4, the system 400 may generally comprise a data storage device 410. For example, the data storage device 410 may be implemented by computer system/server 12 of FIG. 1. The data storage device 410 may comprise a query optimizer 411 (also called "optimizer 411" for short) and a database 412. The database 412 may be a relational database or a non-relational database. The database 412 may comprise one or more data tables 413 including a number of data records to be queried. The optimizer 411 may optimize execution of a query for the database 412. For example, the optimizer 411 may parse a query and determine multiple candidate query paths for executing the query. As used herein, a "query path" refers to a series of operations for executing the query and deriving a result of the query. The optimizer 411 may selecting an optimal query path by comparing respective costs of different candidate query paths.

As shown in FIG. 4, the data storage device 410 may receive, for example, from a user, a query 420 for the data tables 413 to query data records that satisfy a query condition. The optimizer 411 may determine an optimal query path for executing the query 420, which indicates a series of operations to be performed on data records comprised in the data tables 413. The optimizer 411 may perform the determined series of operations on the data records, so as to derive a result 430 of the query 420.

Figure 5:
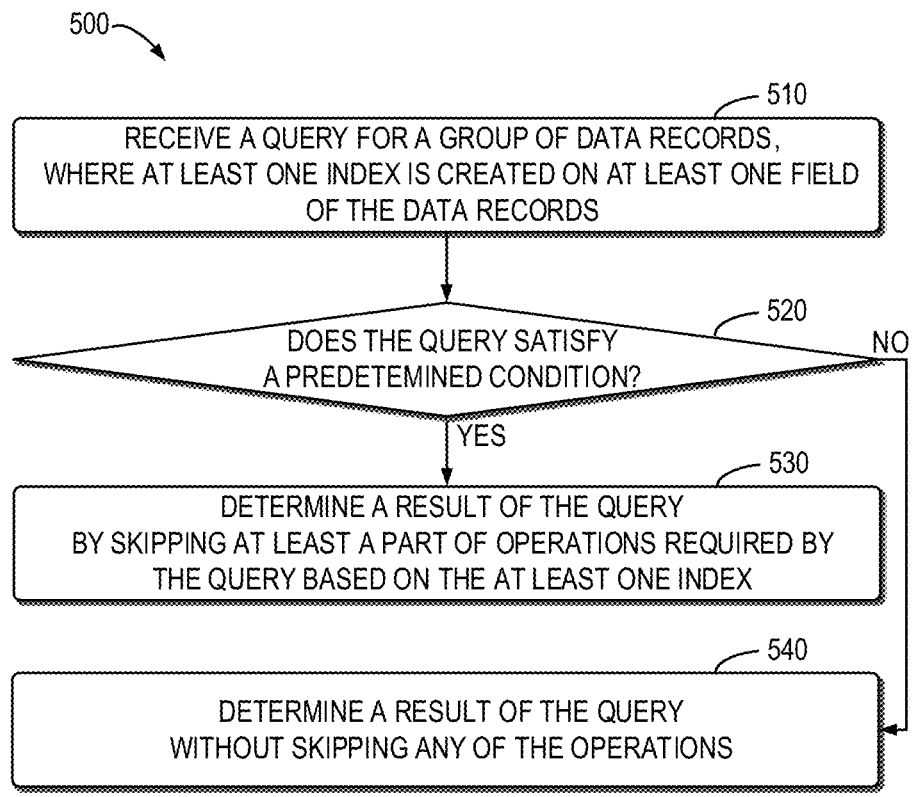
FIG. 5 depicts a flowchart of an example method for database query according to embodiments of the present disclosure.

FIG. 5 depicts a flowchart of an example method 500 for database query according to embodiments of the present disclosure. For example, the method 500 may be implemented at the optimizer 411 shown in FIG. 4. It is to be understood that the method 500 may also comprise additional blocks (not shown) and/or may omit the illustrated blocks. The scope of the present disclosure described herein is not limited in this aspect.

At block 510, the optimizer 411 can receive a query 420 for a group of data records. For example, the data records are comprised in the data tables 413 shown in FIG. 4. In some embodiments, at least one index is created on at least one field of the data records. The at least one index comprises index entries storing respective values of the at least one field of the data records and the index entries are ordered according to the values of the at least one field.

At block 520, the optimizer 411 can determine whether the query 420 satisfies a predetermined condition for skipping at least a part of operations required by the query 420 based on the at least one index. If it is determined that the query 420 satisfies the predetermined condition, at block 530, the optimizer 411 can determine a result 430 of the query 420 by skipping at least a part of the operations based on the at least one index. Otherwise, at block 540, the optimizer 411 can determine the result 430 of the query 420 without skipping any of the operations.

In some embodiments, the optimizer 411 may parse the query 420 and determine, based on a combination of predetermined functions comprised in the query 420, whether at least a part of the operations can be skipped based on the created index. If there is no combination of predetermined functions comprised in the query 420, the optimizer 411 may determine that the query 420 does not satisfy the predetermined condition. Alternatively, if there is a combination of predetermined functions comprised in the query 420 but the created index cannot be used to skip any of the operations, the optimizer 411 may determine that the query 420 does not satisfy the predetermined condition. In some embodiments, if there is a combination of predetermined functions comprised in the query 420 and the created index can be used to skip at least a part of the operations, the optimizer 411 may determine that the query 420 satisfies the predetermined condition and thus determine the result 430 of the query 420 by skipping at least a part of the operations required by the query 420 based on the at least one index.

In some embodiments, the predetermined functions may comprise at least one of the following: a function for selecting distinct data records (for example, the query includes a "distinct" statement), a function for grouping data records (for example, the query includes a function "$group" or a "group by" statement), a function for checking existence of data records (for example, the query includes a function "$exists" or an "exists" statement), a function for aggregation (for example, the query includes functions "$max", "$min," "MAX( )" and/or "MIN( )") and a function for joining different data tables (for example, the query includes a "join" statement or a function "$lookup"). Several examples will be illustrated in the following for detailed explanations.

Example 1

For example, Table 1 illustrates an example collection "sales" comprising the fields "_id," "item," "amount" and "date." It is assumed that an index has been created on the "amount" field of the collection "sales."

TABLE 1

| Collection "sales" | | | |
| --- | --- | --- | --- |
| _id | item | amount | date |
| 1 | abc | 20 | ISODate("2014-01-01T08:00:00Z") |
| 2 | jkl | 20 | ISODate("2014-02-03T09:00:00Z") |
| 3 | xyz | 25 | ISODate("2014-02-03T09:05:00Z") |
| 4 | abc | 100 | IS ODate("2014-02-15T08:00:00Z") |

TABLE 1-continued

| Collection "sales" | | | |
|---|---|---|---|
| _id | item | amount | date |
| 5 | xyz | 50 | IS ODate("2014-02-15T09:05:00Z") |

For example, the query 420 may be read as below:

```
db.sales.aggregate([
{$group:
    {_id: {day:{$dayOfYear: "$date"}, year:{$year: "$date"}},
    max_amount:{$max: "$amount"})}
}])
```

Through parsing the query 420, it can be determined that the functions "$group" and "$max" are included in the query 420. It can also be determined that the query 420 requires grouping the documents of the collection "sales" according to the date and year of the "date" field and then using $max to compute the maximum value of the "amount" field in each group of documents. As described above, an index is created on the "amount" field, and thus index entries storing values of the "amount" field are sorted in ascending or descending order. Therefore, after grouping the documents according to the date and year of the "date" field, the value of the "amount" field stored in the first or last index entry in each group can be taken as the maximum value of the "amount" field in the group. That is, there is no need to perform an additional sort operation on the "amount" field or scan every index entry in the group.

In some embodiments, with respect to the above example 1, the optimizer 411 may skip the sort operation on the "amount" field and skip scanning invalid index entries in each group. For example, with respect to the above example 1, the result 430 of the query 420 can be determined as:

{"_id": {"day":1, "year":2014}, "max_amount":20}

{"_id": {"day":34, "year":2014}, "max_amount":25}

{"_id": {"day": 46, "year":2014}, "max_amount":100}.

Example 2

For another example, Table 2 illustrates an example collection "myCollA" comprising fields "c1" and "c2", while Table 3 illustrates another example collection "myCollB" comprising fields "c1," "c2," "c3" and "c4." It is assumed that an index has been created on the fields "c1" and "c2" of the collection "myCollA."

TABLE 2

| Collection "my CollA" | |
|---|---|
| c1 | c2 |
| 1 | 2 |
| 1 | 2 |
| 5 | 10 |
| 5 | 10 |
| 5 | 10 |

TABLE 3

| Collection "myCollB" | | | |
|---|---|---|---|
| c1 | c2 | c3 | c4 |
| 1 | 5 | 1 | 2 |
| 2 | 2 | 1 | 2 |
| 3 | 10 | 1 | 2 |
| 4 | 10 | 1 | 2 |
| 5 | 10 | 2 | 2 |
| 6 | 10 | 3 | 4 |

For example, the query 420 may be read as below:

```
db.myCollB.distinct(["c3"
{"$match": {"myCollA.c1"=5}},
{db.myCollB.aggregate([
{"$lookup":
    {"localField": "c2",
    "from": "myCollA",
    "foreignField": "c2",
    "as": "myColl_T"}},
{"$unwind": "$myColl_T"},
{"$project": {
    "c1": 1
    "c2": 1
    "myColl_T.c1": 1,
    "myColl_T.c2": 1,
    "myColl_T.c3",
    "myColl_T.c4"}}
])}])
```

Through parsing the query 420, it can be determined that the functions "distinct" and "$lookup" are included in the query 420. It can also be determined that the query 420 requires joining the collections "myCollA" and "myCollB" based on a join condition "myCollA.c2=myCollB.c2" and selecting, from the joined collection, distinct values of myCollB.c3 where the condition "myCollA.c1=5" should be satisfied.

Conventionally, in order to execute the query 420, in each time, it is required to access the collection "myCollA," obtain the value of myCollA.c2 of each document and evaluate whether the obtained value of myCollA.c2 is equal to the value of myCollB.c2 of each document in the collection "myCollB." However, if the value of myCollA.c2 obtained at the $n^{th}$ time is equal to the value of myCollA.c2 obtained at the $(n+1)^{th}$ time, the evaluation of the join condition at the (n+1) time can be skipped. That is because the same values of myCollA.c2 obtained at the $n^{th}$ time and at the (n+1) time will produce identical results but the function "distinct" will filter out the same results. In this case, with respect to the same value of myCollA.c2, only one evaluation of the join condition is needed.

As described above, since an index is created on the fields "c1" and "c2" of the collection "myCollA," index entries storing values of the fields "c1" and "c2" are sorted in ascending or descending order. In this case, if a first index entry storing a first value of myCollA.c2 was accessed at the n time, a second index entry storing a second value of myCollA.c2 different from the first value of myCollA.c2 can be accessed at the (n+1) time. That is, there is no need to scan index entries between the first index entry and the second index entry, since they store duplicated values of myCollA.c2 which contribute nothing to the result of the query.

In some embodiments, with respect to the above example 2, the optimizer 411 may skip scanning duplicated index entries comprised in the index created on the fields "c1" and "c2" of the collection "myCollA." For example, with respect to the above example 2, the result 430 of the query 420 can be determined as: [1, 2, 3].

Example 3

Still with reference to the above Table 2 and Table 3, for another example, the query 420 may be read as below:

```
db.myCollB.distinct(["c1"
{db.myCollB.aggregate([
    {c1: {$exitsts:true}
    "$lookup":
        {"localField": "c2",
        "from": "myCollA",
        "foreignField": "c2",
        "as": "myColl_T"}},
    {"$unwind": "$myColl_T"},
    {"$project": {
        "c1": 1
        "c2": 1
        "myColl_T.c1": 1,
        "myColl_T.c2": 1}}
])})
```

Through parsing the query 420, it can be determined that the functions "distinct" and "$exitsts" are included in the query 420. It can also be determined that the query 420 requires selecting, from the collection "myCollB," distinct values of myCollB.c1 where the condition "myCollA.c2=myCollB.c2" should be satisfied.

Conventionally, in order to execute the query 420, in each time, it is necessary to access the collection "myCollA," obtain the value of myCollA.c2 of each document and then check whether there is a document in the collection "myCollB" whose value of myCollB.c2 equals to the obtained value of myCollA.c2. However, if the value of myCollA.c2 obtained at then time is equal to the value of myCollA.c2 obtained at the (n+1) time, the existence check at the (n+1) time can be skipped. That is because the same values of myCollA.c2 obtained at then time and the at the (n+1) time will produce identical results of the existence check. In this case, with respect to the same value of myCollA.c2, only one existence check is needed.

As described above, since an index is created on the fields "c1" and "c2" of the collection "myCollA," index entries storing values of the fields "c1" and "c2" are sorted in ascending or descending order. In this case, if a first index entry storing a first value of myCollA.c2 was accessed at the n time, a second index entry storing a second value of myCollA.c2 different from the first value of myCollA.c2 can be accessed at the (n+1) time. That is, there is no need to scan index entries between the first index entry and the second index entry, since they store duplicated values of myCollA.c2.

In some embodiments, with respect to the above example 3, the optimizer 411 may skip scanning duplicated index entries comprised in the index created on the fields "c1" and "c2" of the collection "myCollA." For example, with respect to the above example 3, the result 430 of the query 420 can be determined as: [3, 4, 5, 6].

Alternatively, in some embodiments, if it is determined that at least a part of the operations can be skipped, the optimizer 411 may further compare a cost (also referred to as "first cost" in the following) of skipping at least a part of the operations based on the at least one index with a cost (also referred to as "second cost" in the following) of not skipping any of the operations. As used herein, the first cost refers to a processing overhead for skipping at least a part of the operations based on the at least one index, while the second cost refers to a processing overhead for not skipping any of the operations. It is to be understood that, the first cost and the second cost can be determined in any manner currently known or to be developed in the future and the scope of the present disclosure is not limited in this aspect. If the first cost is equal to or greater than the second cost, the optimizer 411 may determine that the query 420 does not satisfy the predetermined condition and thus none of the operations required by the query 420 will be skipped. If the first cost is less than the second cost, the optimizer 411 may determine that the query 420 satisfies the predetermined condition and thus determine the result 430 of the query 420 by skipping at least a part of the operations required by the query 420 based on the at least one index.

In some embodiments, the cost for executing a normal query without skipping any of operations required by the query can be determined as: base_cost+search_cost, where base_cost represents a cost or processing overhead for parsing a query and search_cost represents a cost or processing overhead for searching data records according to the query. It is to be understood that, base_cost and search_cost can be determined in any manner currently known or to be developed in the future and the scope of the present disclosure is not limited in this aspect. The cost of skipping at least a part of the operations (such as, skipping scanning invalid or duplicated index entries) based on the created index can be determined as below: base_cost+ search_cost*reduction_ratio+leap_cost, where reduction_ratio represents a ratio by which search_cost can be reduced by skipping some operations based on the created index and leap_cost represents a cost or processing overhead for skipping scanning some index entries (for example, the processing overhead for searching a next index entry that is different from the previous one).

In some cases, the query may require a sort operation on one or more fields, and thus the cost for executing a normal query without skipping any of operations required by the query can be determined as: base_cost+search_cost+sort_cost, where sort_cost represents a cost for the sort operation. If an index has been created on the one or more fields, the sort operation can be skipped. Therefore, the cost of skipping at least a part of the operations (such as, skipping the sort operation, and/or skipping scanning invalid or duplicated index entries) based on the created index can be determined as below: base_cost+ search_cost*reduction_ratio+leap_cost. That is, sort_cost can be saved.

In some embodiments, the at least one data table 413 may comprise a plurality of data tables on which a join operation is to be performed according to the query. A plurality of indexes may be created on different data tables. In some embodiments, the optimizer 411 may determine different index combinations based on the plurality of indexes. For example, the different index combinations can be used to skip different parts of operations required by the query. The optimizer 411 may determine respective costs of skipping the different parts of the operations based on the different index combinations. The optimizer 411 may select an index combination with the lowest cost from the different index combinations and determine the result of the query by skipping a corresponding part of the operations based on the selected index combination.

For example, it is assumed that there are three different collections "myCollA", "myCollB" and "myCollC", where indexes are created on the fields "myCollA.a", "myCollB.b"

and "myCollC.c". The query 420 may require a join operation on the collections "myCollA", "myCollB" and "myCollC" and then selecting distinct value combinations from the joined collection. In this case, the optimizer 411 may determine, based on the indexes, different index combinations as following: "myCollA.a", "myCollB.b", "myCollC.c", "myCollA.a"+"myCollB.b", "myCollB.b"+ "myCollC.c", "myCollA.a"+"myCollC.c". For example, the different index combinations can be used to skip different parts of operations required by the query. The optimizer 411 may determine respective costs of skipping the different parts of the operations based on the different index combinations and then select an index combination with the lowest cost. As such, the optimizer 411 can determine an optimal query path for executing the query 420.

It can be seen that, embodiments of the present disclosure provide a solution for processing a database query. According to embodiments of the present disclosure, a query for a group of data records is received. At least one index is created on at least one field of the data records and comprises index entries for storing and sorting respective values of the at least one field of the data records. In response to the query satisfying a predetermined condition, a result of the query is determined by skipping at least a part of operations required by the query based on the at least one index. In this way, the performance for executing a query in a database can be greatly improved. Embodiments of the present disclosure can be applied to both relational database and non-relational database.

It should be noted that the database query according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for processing cloud-based NoSQL database queries, comprising:
   receiving, by one or more processors executing a NoSQL database application, NoSQL queries for a group of data records, wherein at least one index is created on at least one field of the data records and comprises index entries for storing and sorting respective values of the at least one field of the data records and the data;
   determining, by the one or more processors executing the NoSQL database application, if the NoSQL queries satisfies a predetermined condition retrieved from a NoSQL storage location, wherein the predetermined condition is calculated based on adding a base cost and a leap cost to a product of a search cost and a reduction ratio;
   in response to the NoSQL queries satisfying the predetermined condition, executing, by the one or more processors executing the NoSQL database application, the NOSQL queries and determining, by one or more processors executing the NoSQL database application, a result of the NoSQL queries by skipping at least a part of operations required by the NoSQL queries based on the at least one index; and
   storing, by the one or more processors executing the NoSQL database application, the predetermined condition in the NoSQL storage location.

2. The computer-implemented method of claim 1, wherein the operations comprise scanning each of the index entries, and skipping at least a part of the operations comprises:
   skipping, by one or more processors, scanning at least one of the index entries, wherein the at least one of the index entries contributes nothing to the result of the NoSQL queries.

3. The computer-implemented method of claim 1, further comprising:
   determining, by one or more processors, whether at least a part of the operations can be skipped, based on a combination of predetermined functions comprised in the NoSQL queries; and
   in response to determining that at least a part of the operations can be skipped, determining, by one or more processors, that the NoSQL queries satisfies the predetermined condition.

4. The computer-implemented method of claim 3, wherein the predetermined functions comprise at least one of the following:
   a function for selecting distinct data records;
   a function for grouping data records;
   a function for checking existence of data records;
   a function for aggregation; and
   a function for joining data tables comprising the group of data records.

5. The computer-implemented method of claim 1, further comprising:
   determining, by one or more processors, a first cost of skipping at least a part of the operations based on the at least one index and a second cost of not skipping any of the operations; and
   in response to the first cost being below the second cost, determining, by one or more processors, that the NoSQL queries satisfies the predetermined condition.

6. The computer-implemented method of claim 1, wherein the data records are comprised in a plurality of data tables to be joined, the at least one index comprises a plurality of indexes created for the data tables, and determining the result of the NoSQL queries comprises:
   determining, by one or more processors, different index combinations based on the plurality of indexes, wherein the different index combinations can be used to skip different parts of the operations;
   determining, by one or more processors, respective costs of skipping the different parts of the operations based on the different index combinations;
   selecting, by one or more processors, an index combination with the lowest cost from the different index combinations; and
   determining, by one or more processors, the result of the NoSQL queries by skipping a corresponding part of the operations based on the index combination.

7. The computer-implemented method of claim 1, further comprising:
   in response to the NoSQL queries not satisfying the predetermined condition, determining, by one or more processors, the result of the NoSQL queries without skipping any of the operations.

8. The computer-implemented method of claim 1, wherein the data records are a group of documents comprised in at least one collection in a non-relational database.

9. A computer system for processing cloud-based NoSQL database queries, comprising:

a processing unit; and a memory coupled to the processing unit and storing instructions thereon as part of a NoSQL database application, the instructions, when executed by the processing unit, performing actions comprising:

receiving NoSQL queries for a group of data records, wherein at least one index is created on at least one field of the data records and comprises index entries for storing and sorting respective values of the at least one field of the data records;

determining if the NoSQL queries satisfies a predetermined condition retrieved from a NoSQL storage location, wherein the predetermined condition is calculated based on adding a base cost and a leap cost to a product of a search cost and a reduction ratio;

in response to the NoSQL queries satisfying the predetermined conditions, executing, by the one or more processors, the NOSQL queries and determining a result of the NoSQL queries by skipping at least a part of operations required by the NoSQL queries based on the at least one index; and storing, by the one or more processors executing the NoSQL database application, the predetermined condition in the NoSQL storage location.

10. The computer system of claim 9, wherein the operations comprise scanning each of the index entries, and skipping at least a part of the operations comprises:

skipping scanning at least one of the index entries, wherein the at least one of the index entries contributes nothing to the result of the NoSQL queries.

11. The computer system of claim 9, wherein the actions further comprise:

determining whether at least a part of the operations can be skipped, based on a combination of predetermined functions comprised in the NoSQL queries; and in response to determining that at least a part of the operations can be skipped, determining that the NoSQL queries satisfies the predetermined condition.

12. The computer system of claim 11, wherein the predetermined functions comprise at least one of the following:

a function for selecting distinct data records, a function for grouping data records, a function for checking existence of data records, a function for aggregation, and a function for joining data tables comprising the group of data records.

13. The computer system of claim 9, wherein the actions further comprise:

determining a first cost of skipping at least a part of the operations based on the at least one index and a second cost of not skipping any of the operations; and in response to the first cost being below the second cost, determining that the NoSQL queries satisfies the predetermined condition.

14. The computer system of claim 9, wherein the data records are comprised in a plurality of data tables to be joined, the at least one index comprises a plurality of indexes created for the data tables, and determining the result of the NoSQL queries comprises:

determining different index combinations based on the plurality of indexes, wherein the different index combinations can be used to skip different parts of the operations;

determining respective costs of skipping the different parts of the operations based on the different index combinations;

selecting an index combination with the lowest cost from the different index combinations; and determining the result of the NoSQL queries by skipping a corresponding part of the operations based on the index combination.

15. The computer system of claim 9, wherein the actions further comprise:

in response to the NoSQL queries not satisfying the predetermined condition, determining the result of the NoSQL queries without skipping any of the operations.

16. The computer system of claim 9, wherein the data records are a group of documents comprised in at least one collection in a non-relational database.

17. A computer program product for processing cloud-based NoSQL database queries, being tangibly stored on a non-transient machine-readable medium and comprising machine-executable instructions as part of a NoSQL database application, the instructions, when executed on a device, causing the device to perform actions comprising:

receiving NoSQL queries for a group of data records, wherein at least one index is created on at least one field of the data records and comprises index entries for storing and sorting respective values of the at least one field of the data records;

determining if the NoSQL queries satisfies a predetermined condition retrieved from a NoSQL storage location, wherein the predetermined condition is calculated based on adding a base cost and a leap cost to a product of a search cost and a reduction ratio;

in response to the NoSQL queries satisfying the predetermined conditions, executing, by the one or more processors, the NOSQL queries and determining a result of the NoSQL queries by skipping at least a part of operations required by the NoSQL queries based on the at least one index; and storing, by the one or more processors executing the NoSQL database application, the predetermined condition in the NoSQL storage location.

18. The computer program product of claim 17, wherein the operations comprise scanning the index entries, and skipping at least a part of the operations comprises:

skipping scanning at least one of the index entries, wherein the at least one of the index entries contributes nothing to the result of the NoSQL queries.

19. The computer program product of claim 17, wherein the data records are comprised in a plurality of data tables to be joined, the at least one index comprises a plurality of indexes created for the data tables, and determining the result of the NoSQL queries comprises:

determining different index combinations based on the plurality of indexes, wherein the different index combinations can be used to skip different parts of the operations;

determining respective costs of skipping the different parts of the operations based on the different index combinations;

selecting an index combination with the lowest cost from the different index combinations; and determining the result of the NoSQL queries by skipping a corresponding part of the operations based on the index combination.

20. The computer program product of claim 17, wherein the actions further comprise:

in response to the NoSQL queries not satisfying the predetermined condition, determining the result of the NoSQL queries without skipping any of the operations.

* * * * *